United States Patent [19]

Davison

[11] Patent Number: 4,621,540

[45] Date of Patent: Nov. 11, 1986

[54] AXLE LOCKING DIFFERENTIAL DEVICE

[75] Inventor: Kent E. Davison, Columbia City, Ind.

[73] Assignee: Dana Corporation, Toledo, Ohio

[21] Appl. No.: 600,861

[22] Filed: Apr. 16, 1984

[51] Int. Cl.$^4$ ............................................. F16H 1/44
[52] U.S. Cl. .................................................. 74/710.5
[58] Field of Search ...................... 74/710.5, 711, 713, 74/606 R, 607, 650

[56] References Cited

U.S. PATENT DOCUMENTS

| | | | |
|---|---|---|---|
| 2,015,969 | 10/1935 | Schildknecht | 74/607 |
| 2,335,080 | 11/1943 | Piron | 74/424 |
| 2,351,234 | 6/1944 | Schon | 74/650 |
| 2,378,589 | 6/1945 | Slack | 115/34 |
| 2,501,956 | 3/1950 | Misener | 74/710.5 |
| 2,557,937 | 6/1951 | Buckendale | 74/713 |
| 2,558,841 | 7/1951 | Gordon | 74/417 |
| 3,008,350 | 11/1961 | Misener | 74/710.5 |
| 3,145,583 | 8/1964 | Frentzel | 74/711 |
| 3,323,844 | 6/1967 | Hedstrom | 74/607 |
| 3,864,992 | 2/1975 | Lovdahl | 74/710.5 X |
| 4,064,956 | 12/1977 | Wildey | 180/24.05 |
| 4,169,394 | 10/1979 | Estrada | 74/713 |
| 4,379,413 | 4/1983 | Brammer et al. | 74/710.5 |

FOREIGN PATENT DOCUMENTS

| | | | |
|---|---|---|---|
| 0137646 | 8/1983 | Japan | 74/711 |
| 2137707 | 10/1984 | United Kingdom | 74/710.5 |

*Primary Examiner*—Leslie A. Braun
*Assistant Examiner*—David Novais
*Attorney, Agent, or Firm*—Frank B. McDonald

[57] ABSTRACT

An axle locking device designed for installation in a standard vehicular differential case is defined by two mating unitary bodies piloted between a cross member and the interior walls of the case. In a preferred form, the halves are symmetrical, each half including a pair of pilot surfaces defined by cradles which engage the cross member. Other pilot surfaces are disposed in three orthogonal planes for engagement with the interior wall surfaces of the case, particularly the axle and cross member bore areas. Collectively, the pilot surfaces of the locking device eliminate any requirement for positive securement by fasteners of the locking device to either the cross member of the interior walls of the case.

8 Claims, 2 Drawing Figures

AXLE LOCKING DIFFERENTIAL DEVICE

BACKGROUND OF THE INVENTION

This invention relates to differential locking mechanisms for preventing differential action, and particularly to locking mechanisms designed for retrofitting existing differential systems.

Many currently available differential locking devices require varying degrees of modification of standard differential case or cross members, or both. Although some modifications are less cumbersome than others, the resultant conversions nonetheless tend to be expensive and in some cases impractical. As a result, shortcuts are often taken, such as for example welding of side gear or pinion members to the case. Although such practices are often successful, the associated failure rate has resulted in a continued interest in finding less expensive and more reliable alternatives.

SUMMARY OF THE INVENTION

This invention provides a reliable, relatively inexpensive conversion apparatus for modifying a standard differential system into a locked differential axle system. The device requires only the removal of pinion and side gears, and lends itself to the simple retrofitting of existing systems without modification of standard differential members, such as case or cross member parts.

In a preferred form, the axle locking device of the present invention is defined by two mating halves disposed for mounting within a standard differential case. Each half includes pilot surfaces for close fitting engagement with an existing cross member, each half also including pilot surfaces in three orthogonal planes for close engagement with the interior walls of the case. In the preferred form, each half also includes a splined interior bore for receiving and providing positive engagement with an axle shaft member.

DETAILED DESCRIPTION OF PREFERRED EMBODIMENTS

Figure 1:
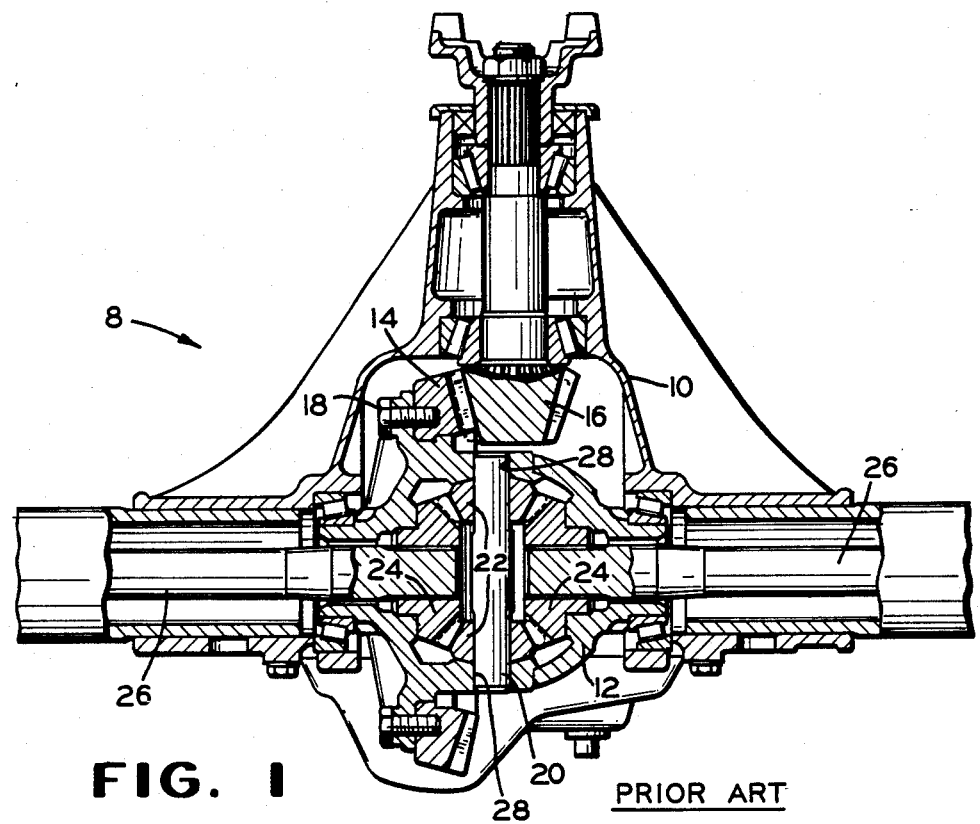
FIG. 1 is a cross sectional view of a standard or conventional differential axle of the prior art.

A conventional prior art differential axle system 8 is shown in FIG. 1. Typically, the system 8 includes an axle housing 10 containing a differential carrier or case 12 for rotation therein. The case is affixed by bolts 18 to a ring gear 14, which engages and is physically rotated by a drive pinion 16 in the typical automotive application. A pair of differential pinions 22 are free to rotate about a cross member 20 supported in bores 28 of the casing. The differential pinions 22 in turn engage a pair of side gears 24 which are internally splined for engaging a pair of matingly splined axle shafts 26.

Figure 2:
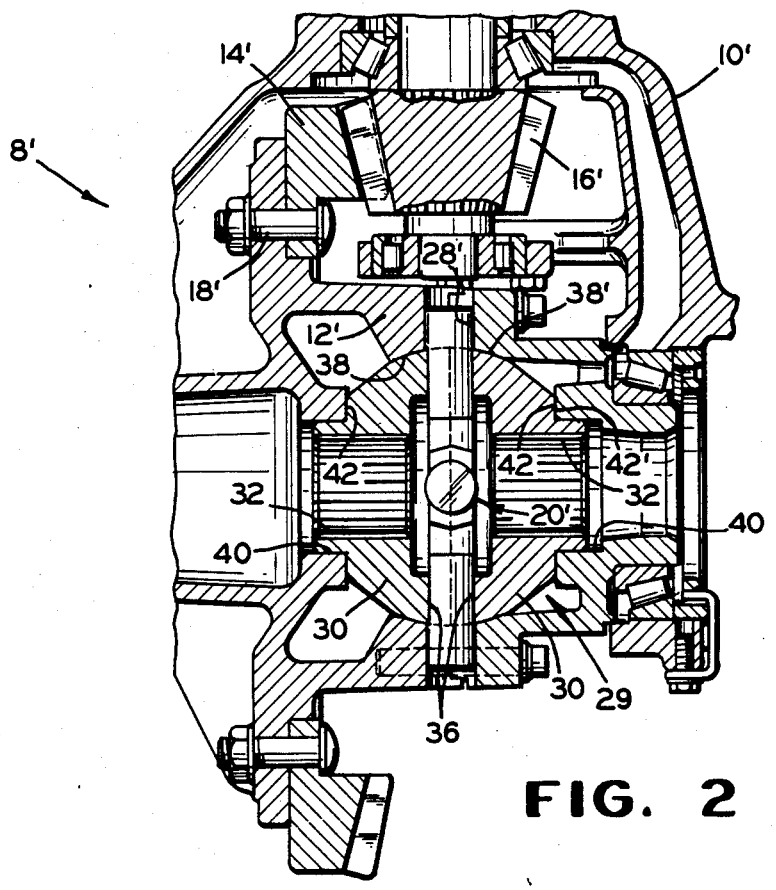
FIG. 2 is a cross sectional view of an axle of the type shown in FIG. 1 after being retrofit to include the axle locking differential device of the present invention.

Referring now to FIG. 2, a locked differential axle system 8' is shown constructed in accordance with the present invention. In order to convert or retrofit a standard prior art differential system (such as shown in FIG. 1) into a locked differential system, a differential locking device 29 may be employed. In a preferred embodiment, the differential locking device 29 is comprised of a pair of reversely identical, mating left and right halves 30; each preferably of a unitary or single-bodied construction. Each half 30 includes a splined bore 32 therethrough for receiving a torque member, such as the axle shafts 26 of FIG. 1. It will be apparent upon a comparison of FIGS. 1 and 2 that such a conversion will require removal of pinion and side gear members from the conventional differential axle system of FIG. 1. It will also be appreciated that no modification of differential parts is involved, and that a standard or conventional differential case and cross member may be utilized in the converted axle system 8', without requirement of removal or adjustment of the latter parts.

A convenient feature of the differential locking device 29 of the present invention is that the device requires no fasteners or other positive connection members for its installation. Instead, the device 29 utilizes a plurality of pilot surfaces to insure its immobile retention within the rotatable case. One of such pilot surfaces provides an abutting engagement of the device 29 with the cross member 20'. For this purpose, each half 30 defines a pair of cradles 36, each of which provides an open-ended, half-cylinder surface for engagement of the cross member 20'. For greatest effectiveness, the size tolerances between cross member and cradle mating surfaces must be close enough to insure that the halves 30 will not have a tendency to move relative to the cross member as the case 12' rotates. In the preferred form, the pair of such cradles 36 share a common axis, and are thus aligned so as to engage opposed ends of the cross member 20' as shown. Each cradle 36 partially envelops the cross member for affording securement thereto; in the preferred form each engages 180 degrees or one-half of the periphery of the cross member.

Other pilot surfaces of the device 29 are in the preferred form associated with bores in the halves 30, such as the cross member bores 28' and the torque member bores 40. Each of the latter bores defines a cylindrical surface disposed for engaging a matable pilot surface on the device 29. In the preferred embodiment, the annular interior wall portions 38 at the cross member bore junction serves as a pilot surface 38' for each half 30. Likewise, the annular interior wall portion 42 at the torque member bore junction provides a pilot surface 42' for each half 30.

It will thus be appreciated by those skilled in the art that the device 29 is fully secured by the cooperation of afore-described pilot surfaces in three orthogonal planes without the use of fasteners or other positive connection means relative to either the case or cross member. As a result, the device 29 is very simple both to manufacture and to install.

In another preferred embodiment, the use of only one of the symmetrical mating halves 30 will provide a right angle drive system, wherein only one torque member is required. Thus, the afore-described symmetrical mating system of this invention lends itself to a versatility unavailable in the use of most prior art differential locking devices.

Although only two preferred embodiments of the present invention have been described herein, the following claims are envisioned to cover numerous similar designs not particularly addressed in the present specification.

What is claimed is:

1. In a differential case having interior walls including a plurality of cross support bores, a unitary cross member having an arcuate periphery positively engaging said support bores; an improvement comprising a unitary differential locking device supported by a plurality of pilot means, said pilot means engaging said cross member and said interior walls in three orthogonal planes, wherein said pilot means engaging said cross member comprises a pair of opposed cradles integrally formed within said locking device each having a bearing surface defined by an open-ended half-cylinder, wherein each surface directly engages one half of the arcuate periphery of said cross member whereby each of said cradles envelops 180 degrees of said periphery.

2. The differential case of claim 1 further comprising a bore for receiving a torque member, said bore having a junction defined by an axially extending cylindrical surface and an annular interior wall surface disposed radially relative to said cylindrical surface, wherein one of said pilot means of said locking device engages said cylindrical surface.

3. The differential case of claim 2 wherein another of said pilot means engages said annular interior wall surface at said junction of said bore.

4. The differential case of claim 3 wherein each of said cross support bores also defines a junction having a radially extending annular interior wall surface, wherein another of said pilot means of said locking device engages said interior wall surface of said cross support bore junction.

5. The differential case of claim 4 wherein said pilot means of said locking device in engagement with said cross member partially envelops said cross member.

6. The differential case of claim 1 wherein a torque member defines a right angle drive system.

7. In a differential case having interior walls including a pair of bores therethrough, a unitary cross member having an arcuate periphery and being disposed within said case, said member engaging said bores; an improvement comprising an axle locking device defined by two mating halves disposed for mounting within said case, each half including pilot means for engaging said unitary cross member, each half also including pilot means in three orthogonal planes for engagement with said interior walls of said case, wherein each half also comprises means for receiving an axle shaft member, wherein said pilot means engaging said cross member comprises a pair of opposed cradles integrally formed within said locking device each having a bearing surface defined by an open-ended half-cylinder, wherein each surface directly engages one half of the arcuate periphery of said cross member whereby each of said cradles envelops 180 degrees of said periphery.

8. The differential case of claim 7 wherein said mating halves are disposed symmetrically about said cross member.

* * * * *